Oct. 14, 1924. 1,511,946

C. I. CLARKE

MONOPLANE

Filed Nov. 17, 1923 7 Sheets-Sheet 2

Inventor
C.I.Clarke.
By
Attorney

Oct. 14, 1924.  
C. I. CLARKE  
MONOPLANE  
Filed Nov. 17, 1923  
1,511,946  
7 Sheets-Sheet 5

Inventor  
C. I. Clarke.

Oct. 14, 1924.  
C. I. CLARKE  
MONOPLANE  
Filed Nov. 17, 1923  
1,511,946  
7 Sheets-Sheet 7

Inventor  
C. I. Clarke.  
By  
Attorney

Patented Oct. 14, 1924.

1,511,946

UNITED STATES PATENT OFFICE.

CLEMENT I. CLARKE, OF PHILADELPHIA, PENNSYLVANIA.

MONOPLANE.

Application filed November 17, 1923. Serial No. 675,350.

*To all whom it may concern:*

Be it known that I, CLEMENT I. CLARKE, a citizen of the United States, residing at Philadelphia, in the county of Philadelphia and State of Pennsylvania, have invented certain new and useful Improvements in Monoplanes; and I do hereby declare the following to be a full, clear, and exact description of the invention, such as will enable others skilled in the art to which it appertains to make and use the same.

The invention has relation to flying machines and more particularly to the type designated as a monoplane and has for its object to pivotally mount the wings comprising the plane, whereby they are adapted to receive a flapping movement in simulation of the wings of a bird when in flight.

The invention furthermore aims to provide a novel construction and unique drive gearing whereby the machine is adapted to be sustained in the air when the propeller is at rest.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Figure 1:
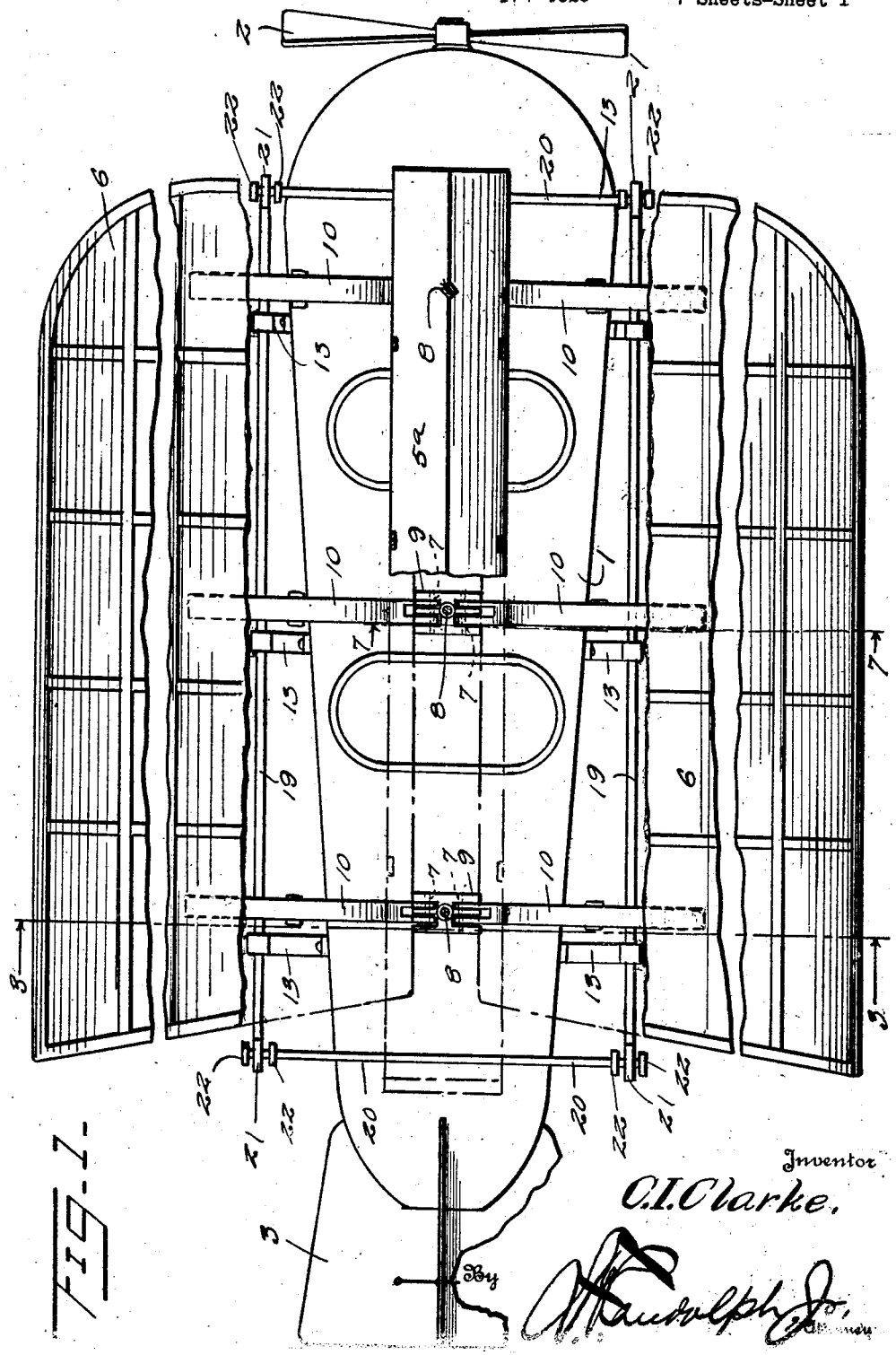
Figure 2:
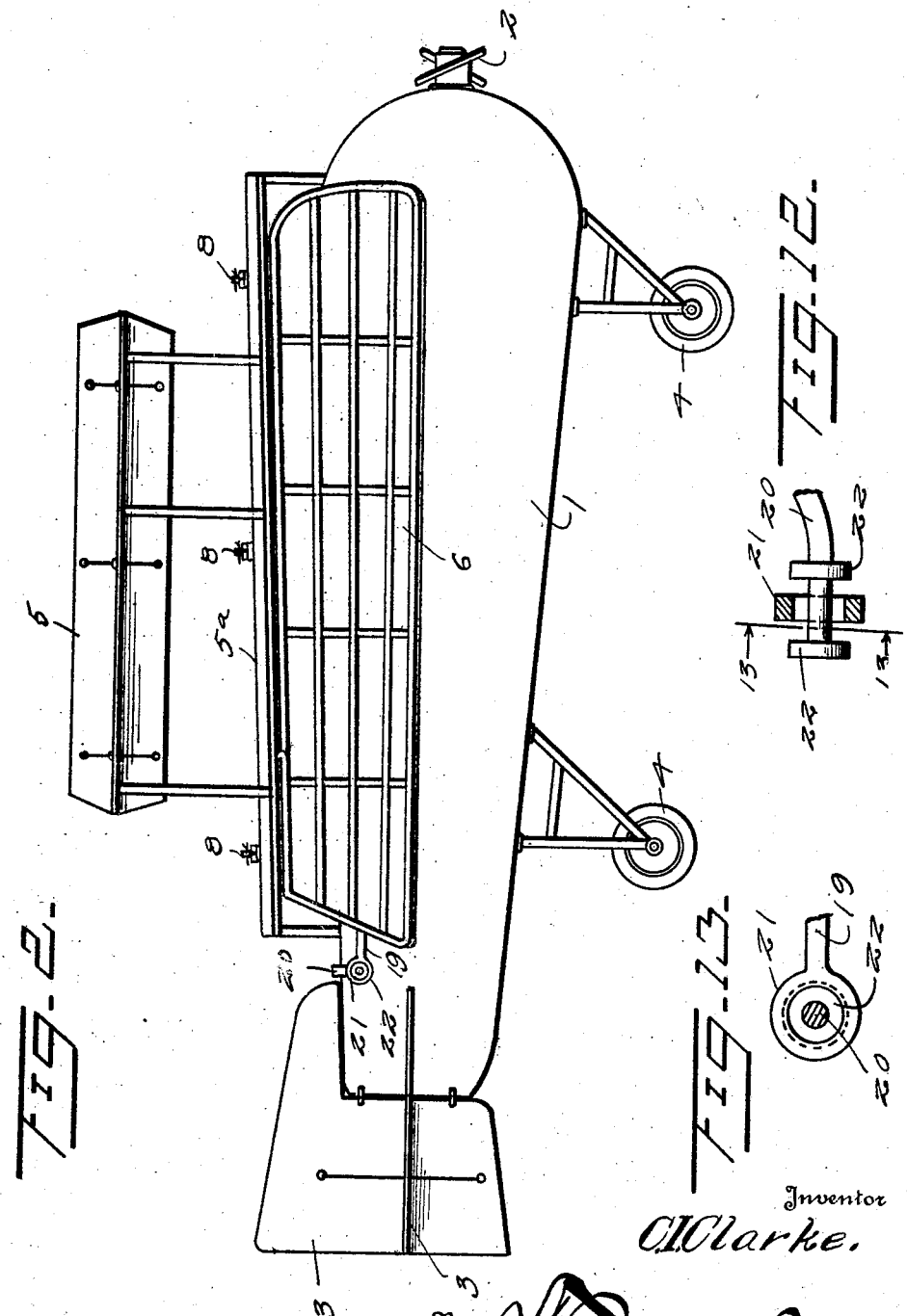
Figure 3:
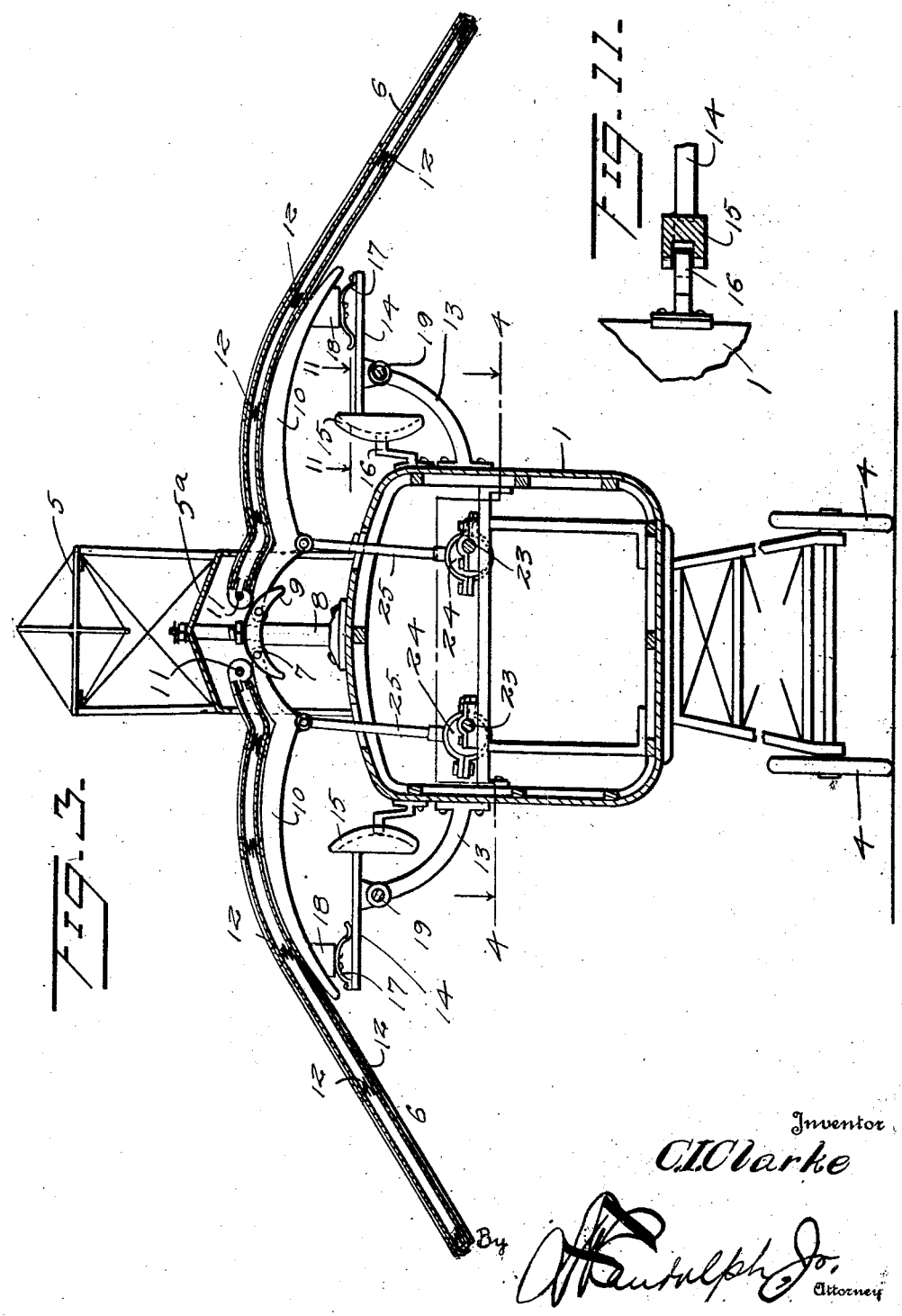
Figure 4:
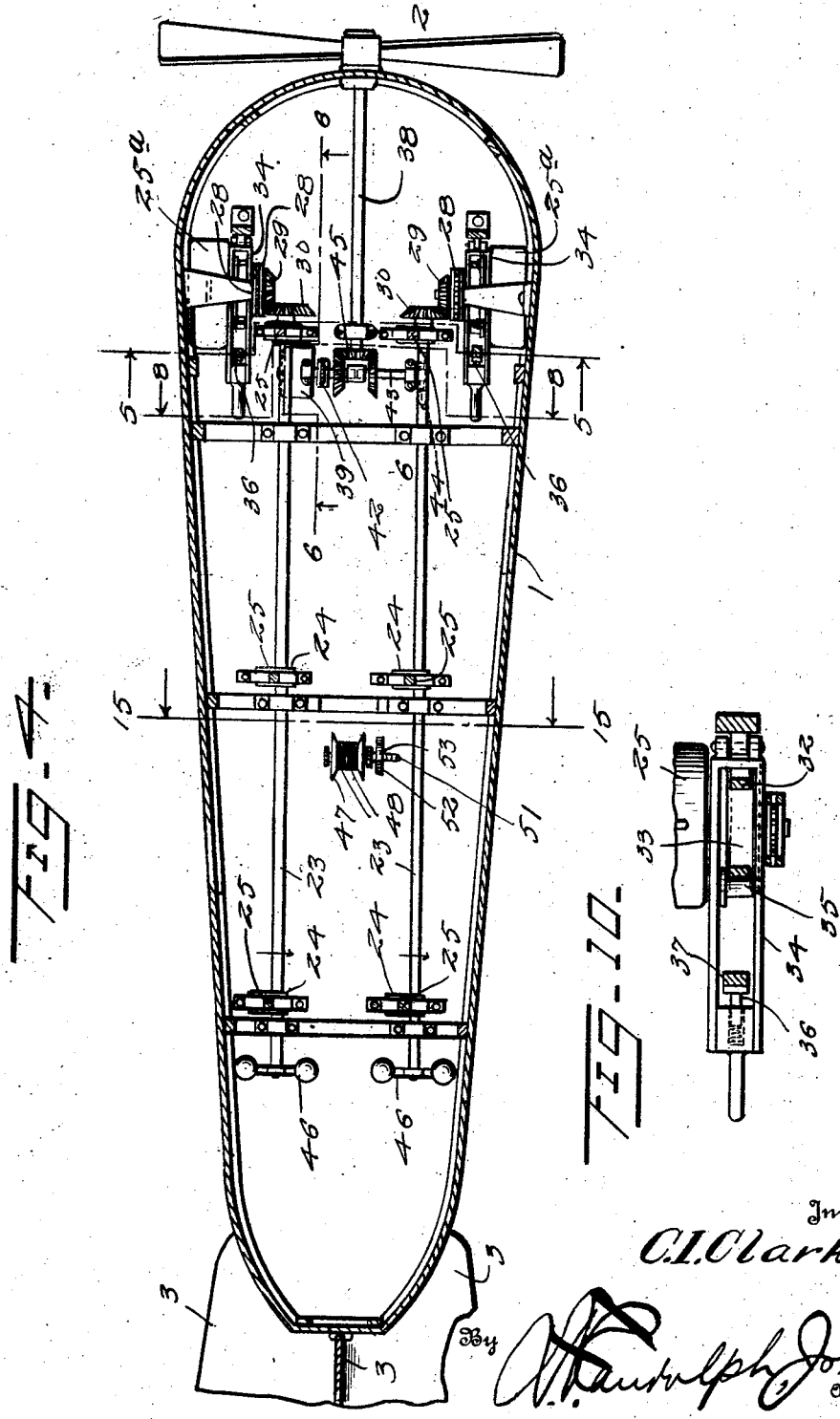
Figure 5:
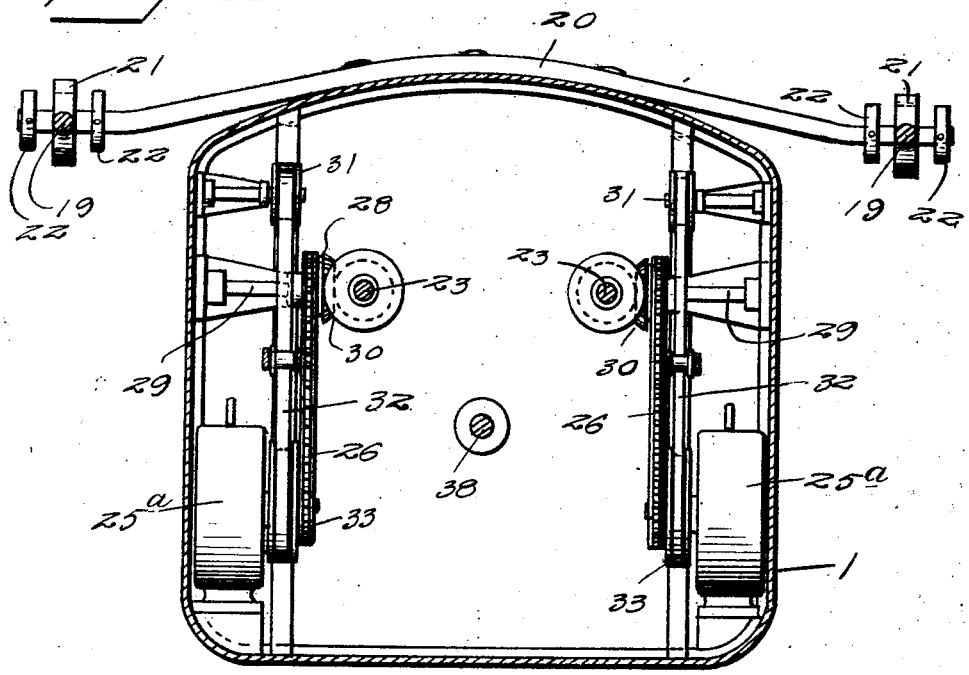
Figure 6:
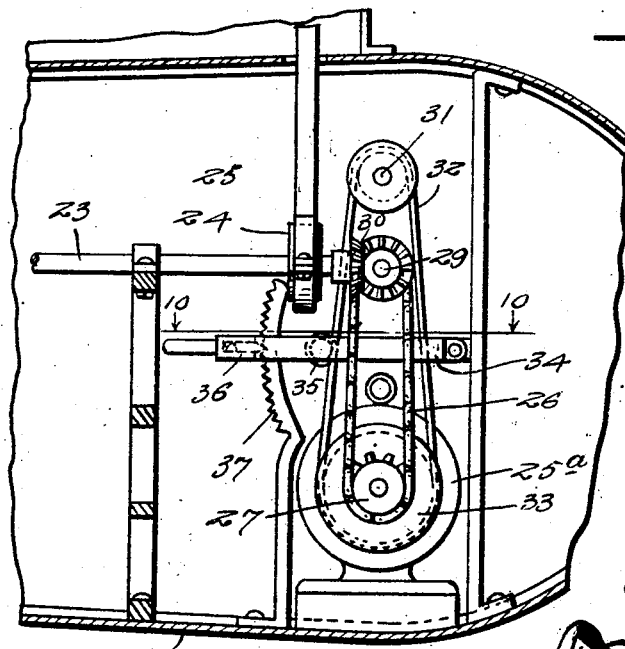
Figure 7:
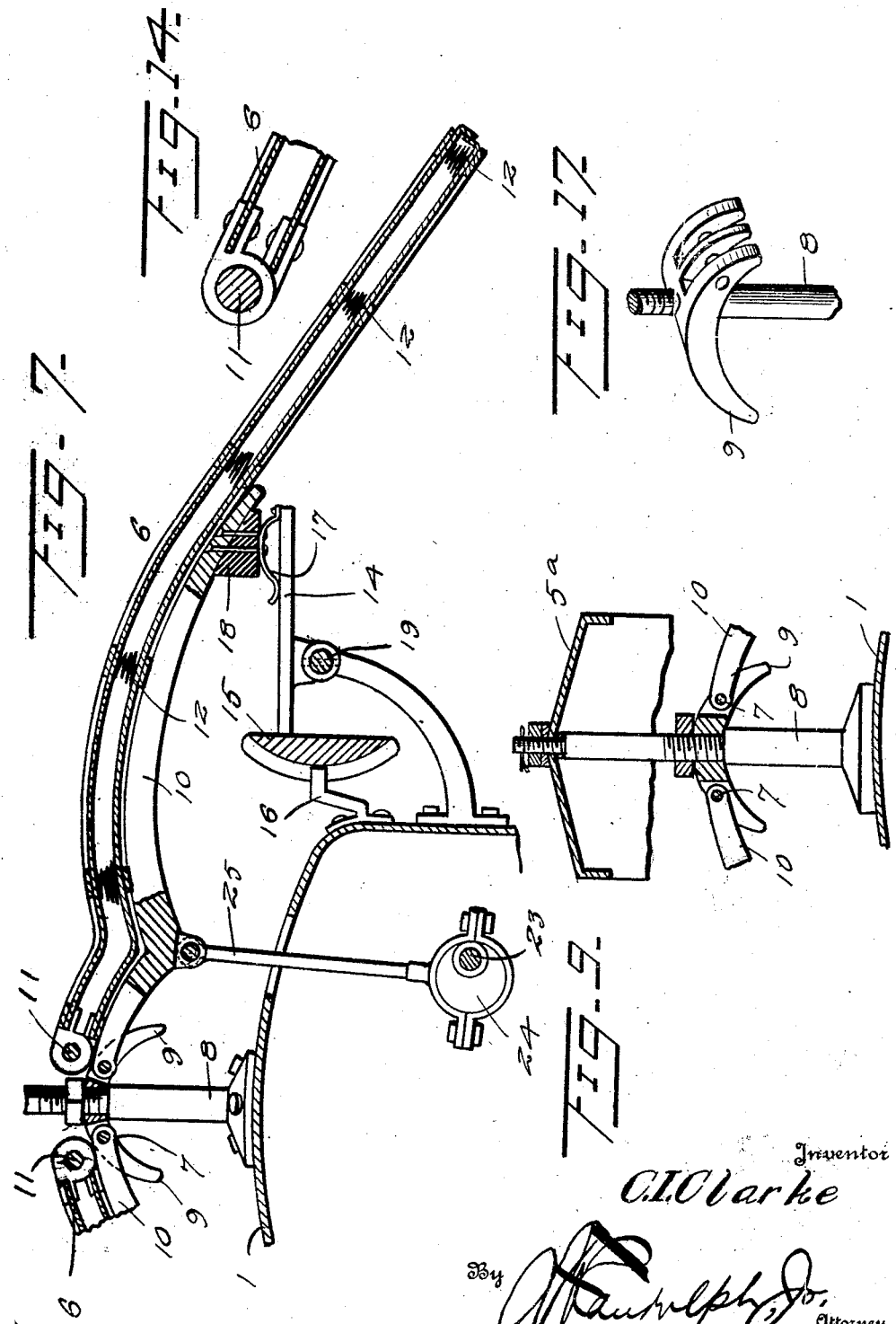
Figure 8:
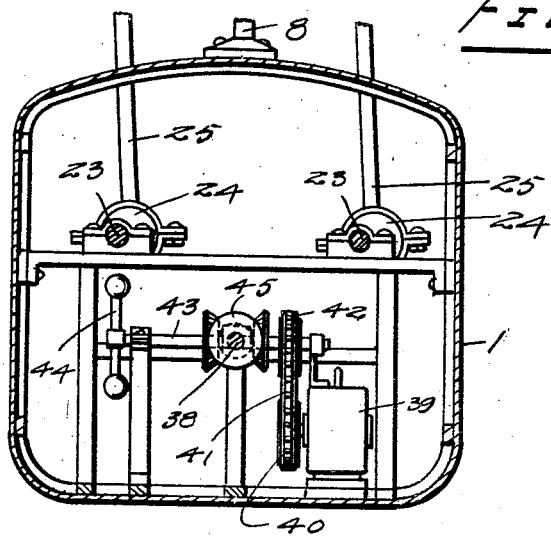
Figure 15:
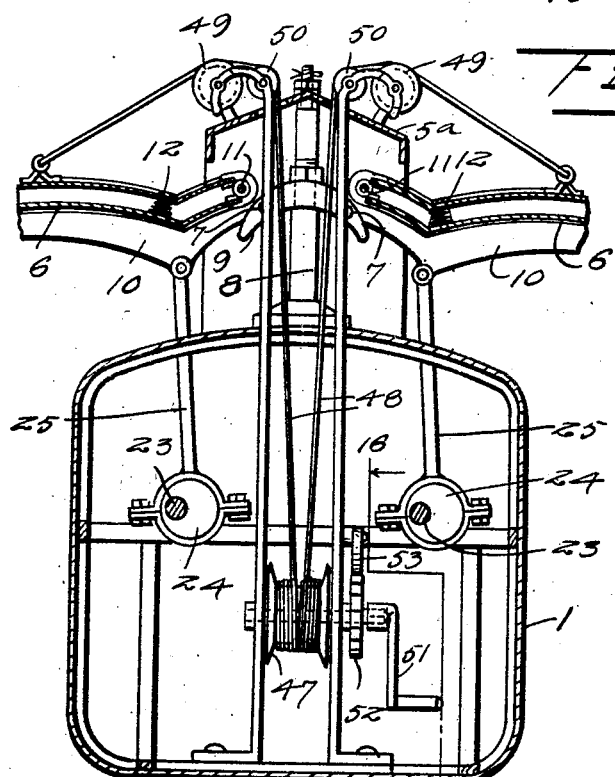
Figure 16:
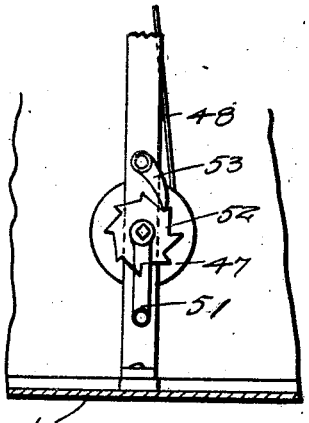

Referring to the accompanying drawings forming a part of the application:

Figure 1 is a top plan view of a flying machine embodying the invention, parts being broken away, Figure 2 is a side view of the machine, Figure 3 is a vertical transverse section on the line 3—3 of Figure 1, looking to the front as indicated by the arrows, Figure 4 is a horizontal sectional view on the line 4—4 of Figure 3, Figure 5 is a vertical transverse section on the line 5—5 of Figure 4, looking to the front as designated by the arrows, and showing the parts on a larger scale, Fig. 6 is an enlarged sectional view on the line 6—6 of Figure 4, looking in the direction of the arrows, Figure 7 is an enlarged detail sectional view on the line 7—7 of Figure 1, looking in the direction of the arrows, Figure 8 is a sectional view on the line 8—8 of Figure 4, looking to the rear as designated by the arrows, Figure 9 is a detail sectional view of one of the standards and crossheads showing the ribs of the wings pivoted to the latter, Figure 10 is a detail sectional view on the line 10—10 of Figure 6, Figure 11 is a sectional detail on the line 11—11 of Figure 3, Figure 12 is a detail view of the outer end of a cross-bar and the end of the shaft which connect a series of pivoted bars at one side of the machine, Figure 13 is a sectional detail on the line 13—13 of Figure 12, Figure 14 is an enlarged sectional view of the pivotal edge of a wing, Figure 15 is an enlarged sectional view on the line 15—15 of Figure 4, looking to the rear as designated by the arrows, Figure 16 is a detail sectional view on the line 16—16 of Figure 15, and Figure 17 is a detail perspective view of a standard and crosshead mounted thereon to which the wings are pivoted.

Corresponding and like parts are referred to in the following description and designated in the several views of the drawings by like reference characters.

The fuselage or body 1 of the machine is tapering and is provided at its front end with the usual propeller 2 and at its rear end with the accustomed rudders 3. The body 1 is mounted upon wheels 4 for launching and landing in the accustomed way. A superstructure 5 is disposed above the body and is utilized for transmitting and receiving messages by wireless, telephone or telegraph in a manner well understood.

The monoplane comprises similar complemental wings 6 which are pivoted along their inner edges as indicated at 7. Standards 8 rise from the top of the fuselage 1 and are provided at their upper ends with transversely curved crossheads 9 to which the wings 6 are pivoted. The wings proper are braced and strengthened by ribs or supports 10 and each wing comprises complemental upper and lower members which are pivotally connected at 11 and between which are disposed helical springs 12, whereby provision is had for independent movement of the members.

Brackets 13 project from opposite sides of the fuselage 1 and pivotally support bars 14. A guide 15 is provided at the inner end of each of the bars 14 and is grooved in its curved edge or face to receive an arm 16 projecting outwardly from the fuselage and constituting a guide to maintain the bar 14 in a given plane. A spring 17 mounted upon the outer end of the bar 14 supports a block 18 upon which rests the outer end of the rib or support 10. The parts 17 and 18 constitute in effect a buffer to sustain the impact of the wing. A shaft 19 is mounted in the brackets 13 at each side of the fuselage and the bars 14 are attached thereto so as to move in unison. A transverse rod or bar 20 at each end of the machine engages a yoke 21 at the ends of the shaft 19, stop collars 22 secured to the ends of the rods 20 coacting with the yokes 21 to limit movement of the bars 14. Two longitudinally disposed shafts 23 are located within the fuselage 1 and each is provided at intervals in its length with eccentrics 24 which are connected by means of straps and rods 25 with the ribs or supports 10. A motor 25$^a$ is provided to drive each of the shafts 23. A sprocket chain 26 connects a sprocket wheel 27 fast to the shaft of the motor with a sprocket wheel 28 fast to a short transverse shaft 29. Bevel gearing 30 connects the shaft 29 with the shaft 23. A shaft 31 paralleling the shaft 29 and located thereabove receives the upper portion of a belt 32 which has its lower portion engaging a pulley 33 fast to the shaft of the motor 25$^a$. A lever 34 pivoted at one end comprises spaced members between which is located a roller 35 disposed to engage a run of the belt 32. A bolt 36 carried by the lever 34 coacts with the teeth of a rack bar 37 to hold the lever in the required adjusted position. When the free end of the lever 34 is depressed, the roller 35 tensions the belt 32 and increases the resistance to its rotation and the resistance thus created operates as a spring to control the speed of the motor.

The propeller shaft 38 is centrally disposed and is geared at its inner end to a motor 39, the shaft of the latter having a sprocket wheel 40 fast thereto which is connected by means of a sprocket chain 41 to a sprocket wheel 42 fast to a transverse shaft 43 which is provided with weighted arms 44 which operate as a counterbalance. Bevel gearing 45 connects the shafts 38 and 43. The shafts 23 are likewise provided with weighted arms 46 similar to the weighted arms 24 and for a like purpose, namely, to insure a steady movement in substantially the same manner as a flywheel.

A windlass 47 conveniently disposed within the fuselage has ropes or cables 48 attached at one end thereto and adapted to be wound thereon, the opposite end of each of the ropes or cables being attached to a wing 6, as shown most clearly in Figure 15. Guide pulleys 49 and 50 mounted upon the superstructure receive the ropes or cables 48 and give proper direction thereto. An operating crank 51 coacts with the windlass 47 to rotate the same. A ratchet wheel 52 secured to the shaft of the windlass has a dog 53 in cooperative relation therewith, whereby to hold the wings 6 in the required adjusted position when the operating power is cut off.

When the machine is in flight, it is driven forwardly by means of the propeller 2 which is assisted by means of the wings 6, the latter being oscillated. When the motor driving the propeller is stopped, the machine may be sustained in the air by means of the wings 6 which are oscillated by the motors 25$^a$. When gliding, the wings are held stationary by means of the ropes or cables 48 and the coacting mechanism associated therewith.

It is observed that the outer ends of the ribs 10 are yieldably connected to the outer ends of the pivoted bars 14 and the latter in turn are fast to the respective shafts 19 so as to move in unison and impart a uniform movement to the wings throughout their extent.

A hood 5$^a$ is supported above the body 1 by means of the standards 8 in a manner to extend over the inner edges of the wings 6 and protect them besides confining the air on the down stroke of the wings and assisting materially in the lifting of the machine.

It is observed that the helical springs 12 are preferably of conical form and give vibration to the wings which will help the machine in its actions. One of the main features of the windlass 47, cords 48 and adjunctive parts is to hold the wings in subjection when the operator finds it necessary to glide instead of flapping.

The belt 32 and lever 34 provide for an emergency in case of non-adherency of the sprocket gearing when in flight. At this time the pulley will fully take the place of the sprocket chain by pressing the lever downwardly. Moreover, the same pulley belt will hold the machine before it makes the stroke downward, assisted by the windlass when the operator finds it necessary to glide. The same pulley belt when pressed ordinarily increases the speed of the motor.

What is claimed is:

1. A plane for a flying machine, the same comprising oppositely disposed wings, each of which consists of spaced members pivotally connected and interposed yieldable connecting means.

2. In a flying machine, a wing, ribs applied to the underside of the wing and pivotally mounted at one of their ends, a yielding support for the other ends of the ribs, and means for imparting an oscillatory movement to the wing having direct connection with the rib thereof.

3. In a flying machine, a pivoted wing, means for imparting an oscillatory movement thereto, a member pivotally supported intermediate its ends and having outer connection with the wing and an inner sliding connection with the body of the machine.

4. In a flying machine, a pivoted wing, means for imparting an oscillatory movement thereto, a member pivotally supported intermediate its ends, a yieldable connection between the outer end of the member and the wing, and a sliding guide connection between the inner end of the member and the body of the machine.

5. In a flying machine, a pivoted wing, means for imparting an oscillatory movement thereto, a bar pivoted intermediate its ends, a yieldable connection between the outer end of the bar and the wing, and coacting guide elements, the one attached to the inner end of the bar and the other to the body of the machine.

6. In a flying machine, ribs pivotally mounted thereon, wings supported by said ribs, each of said wings comprising complemental members pivotally secured at one of their longitudinal edges, and yieldable devices interposed between said members.

7. In a flying machine, brackets suitably secured, rods pivotally mounted on said brackets, means to guide said rods, ribs pivotally mounted independently of and yieldably supported by said rods, and wings on said ribs.

8. In a flying machine, brackets suitably secured, rods pivotally mounted on said brackets, a segmental guide on each rod, ribs pivotally mounted, a yieldable connection between the rods and the ribs, and wings mounted on said ribs.

9. In a flying machine, brackets suitably secured, rods pivotally mounted on said brackets, means to guide said rods, ribs pivotally mounted independently of and yieldably supported by said rods, wings supported by said ribs, each of said wings comprising complemental members pivotally secured at one of their longitudinal edges, and yieldable devices interposed between said members.

10. In a flying machine, a pivoted wing, a shaft, eccentric connections between the shaft and wing for imparting an oscillatory movement to the latter, a motor, gearing connecting the shaft of the motor with the before mentioned shaft, a pulley fast to the shaft of the motor, a belt passing around said pulley, a lever provided with a roller in contact with said belt, and means for holding the lever in an adjusted position, the belt, pulley, roller and lever operating as brake means for controlling the speed of the motor.

In testimony whereof I affix my signature in presence of two witnesses.

CLEMENT I. CLARKE.

Witnesses:
 WM. C. HUGHES,
 ADOLPHUS RAMSEY.